(12) United States Patent
Hayes et al.

(10) Patent No.: US 6,374,318 B1
(45) Date of Patent: Apr. 16, 2002

(54) FILTER-CIRCUIT FOR COMPUTER SYSTEM BUS

(75) Inventors: Stuart W. Hayes; Erik A. Schuchmann, both of Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/174,275

(22) Filed: Oct. 16, 1998

(51) Int. Cl.[7] ................................................ G06F 13/00
(52) U.S. Cl. ....................................... 710/107; 710/100
(58) Field of Search ............................... 710/102, 107, 710/100, 103; 713/1, 2, 100

(56) References Cited

U.S. PATENT DOCUMENTS

| | | | |
|---|---|---|---|
| 4,706,190 A | 11/1987 | Bomba et al. | 364/200 |
| 5,293,621 A | 3/1994 | White et al. | 395/650 |
| 5,327,531 A * | 7/1994 | Bealkowski et al. | 395/164 |
| 5,404,535 A | 4/1995 | Barlow et al. | 395/725 |
| 5,404,559 A | 4/1995 | Bonella et al. | 395/800 |
| 5,418,914 A | 5/1995 | Heil et al. | 395/325 |
| 5,524,235 A | 6/1996 | Larson et al. | 395/478 |
| 5,533,204 A | 7/1996 | Tipley | 395/288 |
| 5,563,532 A | 10/1996 | Wu et al. | 327/34 |
| 5,613,075 A | 3/1997 | Wade et al. | 395/287 |
| 5,623,649 A | 4/1997 | Verdun | 395/558 |
| 5,673,397 A | 9/1997 | Ferguson et al. | 395/250 |
| 5,724,528 A | 3/1998 | Kulik et al. | 395/308 |
| 5,732,244 A | 3/1998 | Gujral | 395/468 |
| 5,737,544 A | 4/1998 | Wszolek | 395/287 |
| 5,740,385 A | 4/1998 | Hayek et al. | 395/308 |
| 5,745,772 A | 4/1998 | Klein | 395/739 |
| 5,748,913 A | 5/1998 | Shibahara | 395/282 |
| 5,754,759 A * | 5/1998 | Clarke et al. | 395/183.13 |
| 5,754,865 A | 5/1998 | Itskin et al. | 395/729 |
| 5,809,559 A * | 9/1998 | Kim | 711/202 |
| 6,073,220 A * | 6/2000 | Gunderson | 711/162 |

OTHER PUBLICATIONS

"*PCI Local Bus Specification, Revision 2.1s*", Jun. 1, 1995, pp. i–xvi and 1–282.

* cited by examiner

Primary Examiner—Robert Beausoleil
Assistant Examiner—Tim Vo
(74) Attorney, Agent, or Firm—Skjerven Morrill MacPherson LLP; David G. Dolezal (57) ABSTRACT

A filter circuit for filtering bus accesses from a computer bus (such as e.g. a bus conforming to the PCI standard) to a group of devices operably coupled to the computer bus in a computer system. The filter circuit operates in a filter mode and a non filter mode. In the non filter mode, the filter circuit allows bus accesses to pass from the computer bus to the group. In the filter mode, the filter circuit blocks bus accesses from passing to the group. Upon determining that a bus access is an allowable bus access, the filter circuit initiates a retry request to signal the bus master that initiated the allowable bus access to reinitiate the bus access, wherein the filter circuit allows the allowable bus access to pass to the group. The filter circuit includes a switch circuit and a control circuit that places the switch circuit in the conductive and non conductive switch states to allow bus accesses to pass and to be blocked from passing to the group, respectively. In the filter mode, the filter circuit allows bus accesses to pass from a device of the group to the computer bus. The filter circuit includes a second switch circuit for controlling the bus accesses by the device of the group. The control circuit includes a programmable logic device. The filter circuit can be used in debugging a computer system which has a malfunctioning flash ROM. A second flash ROM can be inserted into a PCI slot and the filter circuit activated to filter accesses directed towards the malfunctioning flash ROM during the boot-up of the computer system.

55 Claims, 3 Drawing Sheets

FILTER-CIRCUIT FOR COMPUTER SYSTEM BUS

BACKGROUND OF THE INVENTION

1. Field of the Invention

The present invention relates to computer systems and more specifically to computer busses.

2. Description of the Related Art

Computer systems are information handling systems which can be designed to give independent computing power to one user or a plurality of users. Computer systems may be found in many forms including, for example, mainframes, minicomputers, workstations, servers, personal computers, internet terminals, portables, and embedded systems. Personal computer (PC) systems, such as the International Business Machines (IBM) compatible PC systems, include desk top, floor standing, or portable versions. A typical PC system includes a system processor, associated memory and control logic, and a number of peripheral devices that provide input and output for the system. Such peripheral devices often include display monitors, keyboards, mouse-type input devices, floppy and hard disk drives, CD-ROM drives, and printers. The number of devices being added to computer systems continues to grow. For example, many computer systems also include network capability, terminal devices, modems, televisions, sound devices, voice recognition devices, electronic pen devices, and mass storage devices such as tape drives, CD-R drives, or DVDs.

Typically, the system processor is operably coupled to a number of peripheral devices via a computer bus or busses. One computer bus standard is the Peripheral Component Interconnect (PCI) standard as set forth in the PCI, Rev. 2.1s Specification, Jun. 1, 1995, ©1995 PCI Special Interest Group, which is hereby incorporated by reference. Other types of computer bus standards include the Industry Standard Architecture (ISA), Enhanced ISA (EISA), Micro Channel, Personal Computer Memory Card Industry Association (PCMCIA), Universal Serial Bus (USB), and Small Computer System Interface (SCSI).

With some computer bus standards, each device on the bus has a unique address that allows the device to be addressed by other devices on the bus. In debugging a computer system, it is sometimes necessary to place a new device on a bus to perform particular functions such as the functions of a malfunctioning device to determine whether the device is malfunctioning. Since the new device typically has the same bus address as the old device, bus accesses to the old device must be redirected to the new device. Where the malfunctioning device is a slotted device, the old device is removed and the new device is inserted in its slot. However, if the old device is embedded on the mother board of the computer system, removal of the old device is not practical for most debugging purposes.

What is needed is a system for redirecting bus accesses from an old device to a newly installed device without removing the old device from the computer system.

SUMMARY OF THE INVENTION

It has been discovered that providing a computer system with a filter circuit that filters bus accesses advantageously enables the redirection of bus accesses to other devices on a computer bus for such purposes as for testing or debugging a computer system.

In one aspect of the invention, a computer system includes a system processor and a computer bus. The system processor is operably coupled to the computer bus. The computer system also includes a filter circuit coupled to the computer bus. The filter circuit controls bus accesses to a group of at least one device operably coupled to the computer bus. The filter circuit operates in a filter mode and a non filter mode. In the non filter mode, the filter circuit allows bus accesses from the computer bus to pass to the group. In the filter mode, the filter circuit blocks bus accesses from the computer bus from passing to the group. In response to determining that a bus access is an allowable bus access, the filter circuit signals a device that initiated the allowable bus access to reinitiate the allowable bus access wherein the filter circuit allows the reinitiated allowable bus access to pass to the group.

In another aspect of the invention, a method of filtering bus accesses from a computer bus includes transiting to a filter mode from a non filter mode in response to receiving a filter mode transit indication. When in the non filter mode, placing the switch circuit in a conductive switch state to enable a group of at least one device coupled to a computer bus to receive accesses from the computer bus. When in the filter mode, placing the switch circuit in a non conductive switch state to block accesses from passing to the group, sensing a bus access on the computer bus, and determining whether the bus access is an allowable access. If the bus access is determined to be an allowable access, signaling a device to re-initiate the allowable access and placing the switch circuit in a conductive switch state to enable the group to receive the allowable access.

In another aspect of the invention, a computer system includes a system processor and a computer bus conforming to a standard based upon a Peripheral Component Interconnect (PCI) specification. The system processor is operably coupled to the computer bus. The computer system also includes a filter circuit coupled to the computer bus. The filter circuit controls bus transactions from the computer bus to a group of at least one device operably coupled to the computer bus. The filter circuit operates in a filter mode and a non filter mode. In the non filter mode, the filter circuit allows bus transactions from the computer bus to pass to the group. In the filter mode, the filter circuit blocks bus transactions from the computer bus from passing to the group. In response to determining that a bus transaction is an allowable bus transaction, the filter circuit initiates a target initiated request on the computer bus wherein the filter circuit allows a reinitiated allowable bus transaction to pass to the group.

In other aspect, the invention includes a filter circuit for controlling bus accesses from a computer bus to a group of at least one device operably coupled to the computer bus. The filter circuit includes a switch circuit and a control circuit. The filter circuit operates in a filter mode and a non filter mode. In a non filter mode, the control circuit places the switch circuit a conductive switch state to allow accesses from the computer bus to pass to the group. In a filter mode, the control circuit places the switch circuit in a non conductive switch state to block accesses from the computer bus from passing to the group. In response to determining that an access is directed towards an allowable device of the group, the control circuit signals to a device that initiated the allowable access to reinitiate the allowable access wherein the control circuit places the switch circuit in a conductive switch state to allow the reinitiated access to pass to the group.

In another aspect of the invention, a method for booting up a computer system from an auxiliary memory device includes inserting an auxiliary boot up memory device circuit into a computer bus connector and activating a filter circuit coupled to the computer bus. The filter circuit controls accesses to a group of devices that includes a system boot-up memory device. In response to activation, the filter circuit blocks accesses from the computer bus to the group. The method further includes monitoring the computer bus by the filter circuit to detect an access directed towards a device of the group but not directed to the system boot-up memory device. In response to detecting an access on the computer bus directed toward a device of the group but not directed to the system boot-up memory device, signaling a device that initiated the access to reinitiate the access.

One advantage of the present invention is that it allows a user to plug in a device having the same bus address as another device on the system and to redirect bus accesses directed towards the old device to the new device without physically removing the old device from the computer system. Another advantage of the present invention is that it allows one to manually disable particular features of a device without disabling all of the features of the device. Another advantage is that a particular device may be operably decoupled from the system while other devices located on the same computer bus remain operably coupled to the system.

BRIEF DESCRIPTION OF THE DRAWINGS

The present invention may be better understood, and its numerous features and advantages made apparent to those skilled in the art by referencing the accompanying drawings.

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

Figure 1:
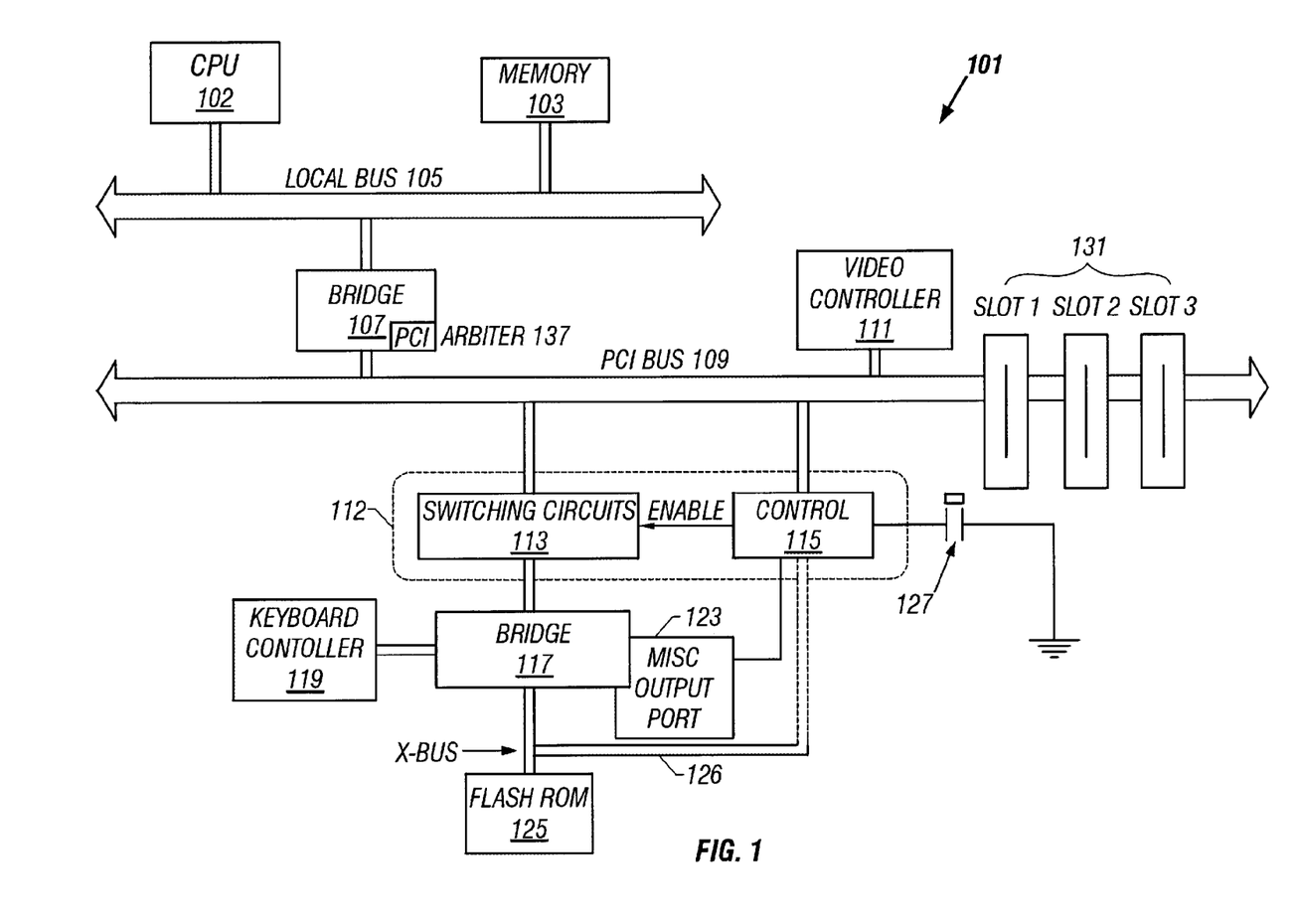
FIG. 1 is a block diagram of a computer system according to the present invention.

FIG. 1 is a block diagram of a computer system according to the present invention. Computer system 101 is a personal computer system having a system processor (CPU 102) and associated system memory 103 operably coupled to the system processor via the local bus 105. System processor 102 is operably coupled to a computer bus 109 via a bridge circuit 107. Computer bus 109 substantially conforms to the PCI Specification, Rev. 2.1s and enables the system processor to be operably coupled to a number of peripheral devices such as a display monitor (not shown) via a video controller 111. System 101 also includes other computer busses such as an expansion bus (X-bus) that allows the system processor to be operably coupled other peripheral devices such as a Flash ROM 125 and keyboard controller 119. X- bus 126 conforms to another bus standard such as the ISA bus standard and is operably coupled to the PCI bus 109 via a PCI/ISA bridge circuit 117 such as the PIIX 4 chip sold by the INTEL CORPORATION.

During the boot-up of computer system 101, bus accesses, such as bus transactions conforming to the PCI standard, are made to the flash ROM 125 via computer busses 109 and 126 to shadow boot-up instructions (e.g. BIOS) to the system memory 103 for the system processor 102 to execute during the boot-up of system 101. If flash ROM 125 were to become corrupted, then computer system 101 would not boot-up properly during start-up. In debugging system 101, a conventional daughter board card with a properly programmed flash ROM and associated PCI compliant bus interface circuitry (card not shown) is inserted into one of the PCI connector slots 131. During boot-up, bus accesses or bus transactions to the Flash ROM are made to the newly installed flash ROM to properly boot-up system 101.

Since the newly installed flash ROM circuit and flash ROM circuit 125 have the same bus address, flash ROM 125 must be operably decoupled from the system in order to ensure that the system 101 is booted-up from the newly installed Flash ROM. Because flash ROM 125 is typically implemented on a chip embedded on the mother board (not shown) of system 101 decoupling flash ROM 125 from system 101 by physically removing the chip may not be practical.

Accordingly, system 101 includes a filter circuit 112 that controls bus transactions to Flash ROM 125 and other devices operably coupled to the PCI bus 109 via the PCI/ISA bridge circuit 117 (such as items 119 and 125). Filter circuit 112 operates in two modes, a filter mode and a non filter mode. When in the non filter mode, filter circuit allows all transactions to pass to the devices operably coupled to computer bus 109 via bridge circuit 117.

In the filter mode, filter circuit 112 initially blocks all bus transactions directed towards the devices operably coupled to bus 109 via bridge circuit 117. The filter circuit monitors the bus transactions on PCI bus 109 to determine if a bus transaction is an allowable transaction. If the transaction is allowable, filter circuit 112 signals the master (the device that initiated the allowable transaction) to reinitiate the transaction. The filter circuit then allows the reinitiated transactions to pass to the devices operably coupled to bus 109 via the bridge circuit 117.

The filter circuit 112 includes switching circuits 113 and a control circuit 115. Control circuit 115 provides an enable signal to place a switch circuit 203 (See FIG. 2) of switching circuits 113 in a conductive switch state to allow bus transactions to pass to the bridge circuit 117 and to place switch circuit 203 in a non conductive state to block bus transactions from passing to bridge circuit 117. The filter circuit is placed in the filter mode by a manually set transit signal from a card BIOS jumper 127 or other type of manually operated switch. The operating modes of filter circuit 112 may also be changed by a processor set transit signal that is provided by a side band signal via a miscellaneous output port 123 of the PIIX 4 bridge circuit 117 or is provided via a bus access over the x-bus 126 or over the PCI bus 109 (if the filter circuit has a bus address). The transit signal may also be initiated from other components in system 101 either by side band signals or bus transactions over other computer busses such as bus 109 or 126.

Figure 2:
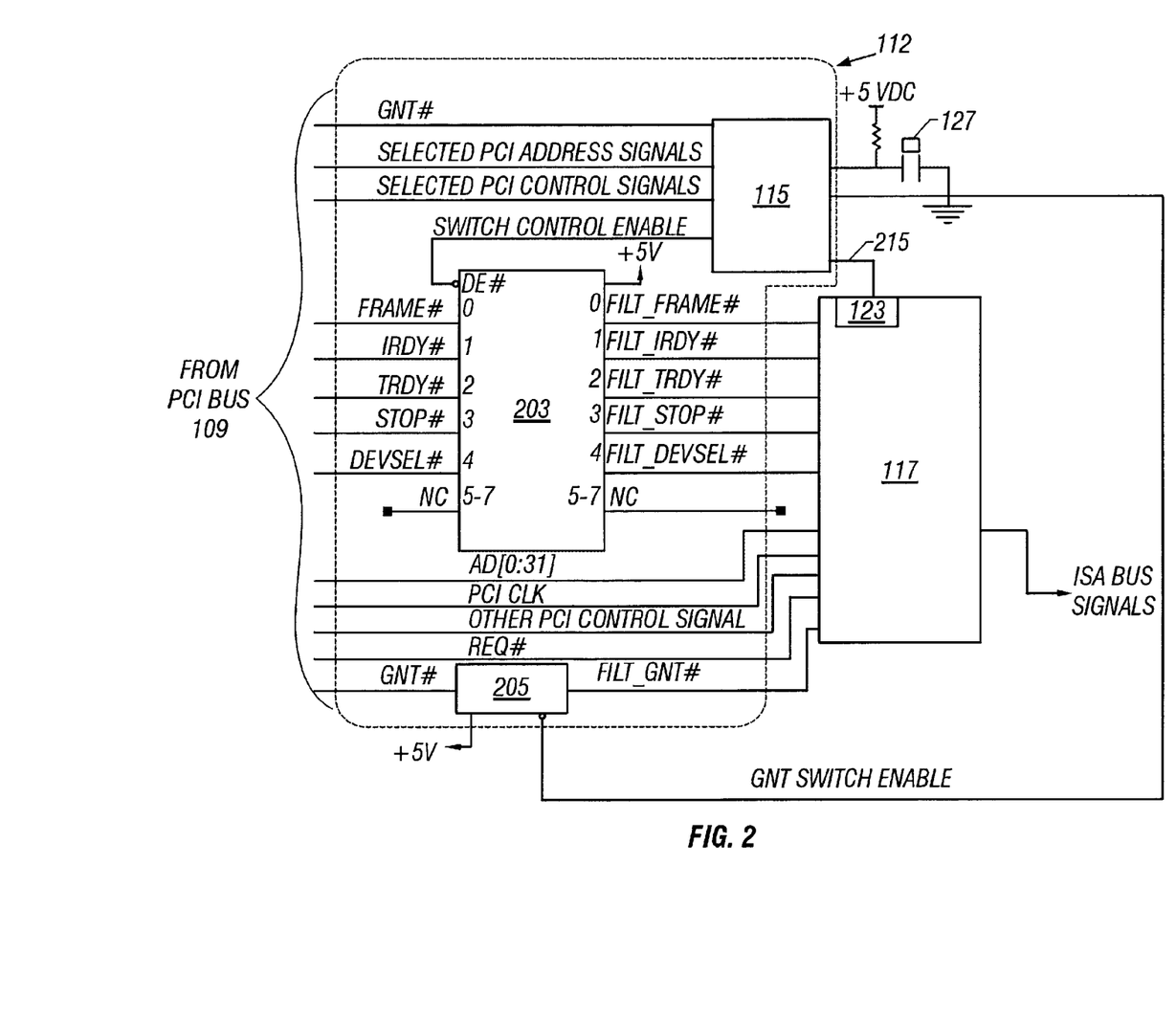
FIG. 2 is a block diagram of a filter circuit and other circuitry according to the present invention.

FIG. 2 is a diagram of the filter circuit 112 and other circuitry according to the present invention. Filter circuit 112 blocks or allows bus transactions to pass to the bridge circuit 117 (and to the devices operably coupled to the bridge circuit) by controlling computer bus control signals. Switch circuit 203 is a solid state, bi-directional relay switch circuit that includes a plurality of bidirectional switches. An example of a circuit is the model number QS3245 circuit sold by QUALITY SEMICONDUCTOR INC. Switch circuit 203 is mounted to the motherboard of computer system 101. However, with other computer systems, switch circuit may be physically coupled to the computer system by other conventional securing techniques. When switch circuit 203 is placed in a conductive switch state by the enable signal from the control circuit 115, PCI control signals connected to the switch are enabled to be received by bridge circuit 117, thus allowing bus transactions to pass to the bridge circuit 117.

When switch circuit 203 is placed in a non conductive switch state, PCI control signals are blocked or isolated from bridge circuit 117. Isolating specific PCI control signals from bridge circuit 117 enables filter circuit 112 to block bus transactions from passing to bridge circuit 117 (and consequently to the devices operably coupled to the computer bus 109 via bridge circuit 117). With the PCI control signals blocked, devices located downstream from bridge circuit 117 (such as keyboard controller 119 and flash ROM 125) are "unaware" that bus transactions directed for those devices are taking place on computer bus 109.

For the filter circuit shown in FIG. 2, the PCI control signals that are controlled by switch circuit 203 are the FRAME#, IRDY#, TRDY#, STOP#, and DEVSEL# control signals. These PCI bus control signals are provided to the bridge circuit 117 via I/O terminals of circuit 113 that are each electrically coupled to a conventional pull-up resistor (not shown). With other filter circuits, different PCI control signals (such as the clock signal) or different combinations of PCI control signals may be controlled by the switch circuit to block bus transactions. In other embodiments, the switch circuit may control other PCI bus signals such as address or clock signals are well.

Control circuit 115 has an output for providing the enable signal to switch circuit 203. Control circuit 115 also has inputs and outputs for receiving and/or providing selected bus address signals and selected bus control signals to the PCI bus 109 to determine whether a bus transaction from PCI bus 109 is an allowable bus transaction and for signaling a master to reinitiate an allowable bus transaction. With some computer system, Control circuit 115 receives all of the bus address signals AD[31::0] and all of the bus command and Byte Enable signals C/BE[3::0]. However with other computer systems, control circuit 115 may receive a portion of the address signals and bus command and Byte Enable bus signals. The portion of bus address signals received would depend upon the resolution required to distinguish between allowable and non allowable transactions. Bus control signals that control circuit 115 receives/ and or provides includes the FRAME#, IRDY#, TRDY#, STOP#, and DEVSEL# bus signals. However, the control circuits for other computer systems may receive or provide other bus control signals such as the CLK, RST#, LOCK#, IDSEL#, REQ#, and/or GNT# bus signal.

The control circuit 115 also has an input 215 that receives a side band signal from the miscellaneous output port 123 of bridge circuit 117 for transiting the filter circuit 112 from the filter mode to the non filter mode and vice versa. With some control circuits according to the present invention, the control circuit has inputs and/or outputs for operably coupling the control circuit to an expansion bus to enable the control circuit to receive a transit signal via a bus access or to be reprogrammed to filter different types of signals or signals addressed to other devices via bus transactions.

In the filter mode, filter circuit 112 is configured to allow bus transactions initiated by a downstream device (a device coupled to the PCI bus 109 via bridge circuit 117 or bridge circuit 117 itself) to pass through to computer bus 109 to other PCI devices operably coupled to the PCI bus 109 on the other side of filter circuit 112 from bridge circuit 117 (referred to as upstream devices). One example of a downstream device initiating a bus transaction is a DMA controller operably coupled to or integrated with bridge circuit 117 accessing system memory 103 to transfer computer data.

To a downstream device, computer bus 109 appears to be in an idle bus state when the PCI bus control signals are being blocked from passing through to bridge circuit 117 in the filter mode. Thus, a downstream device will begin initiating a bus transaction once access to bus 109 has been granted to the downstream device via the downstream device receiving a bus grant control signal (GNT# signal) from bus arbiter 137 which indicates to the requesting downstream device that access to computer bus 109 has been granted.

Accordingly, the switching circuits 113 include a second switch circuit 205 for filtering the GNT# signal directed to bridge circuit 117 and other downstream devices as provided by PCI bus arbiter 137. When switch circuit 205 is in a conductive switch state, the GNT# signal is allowed to pass to bridge circuit 117. When switch circuit 205 is in a non conductive switch state, the GNT# signal is blocked from passing to bridge circuit 117. Control circuit 115 provides a GNT# switch enable signal to switch circuit 205 to control the switch state of switch circuit 205. Filtering the GNT# signal to bridge circuit 117 enables control circuit 115 to control the initiation of bus transactions from a downstream device thereby preventing the initiation of a transaction from occurring when bus 109 is in a non idle bus state. Switch circuit 205 is a solid state, bi-directional relay switch circuit that includes a bidirectional switch. An example of a circuit is the Model number QS3245 circuit sold by QUALITY SEMICONDUCTOR INC. With other filter circuits, switch circuits 203 and 205 are integrated on the same chip.

Control circuit 115 is implemented with a programmable logic device chip such a XC95108 the XYLINX CORP. or other type of programmable array logic (PAL) circuit or a programmable logic array (PLA) circuit. An example of programming code for control circuit 115 is found in a later section of this specification entitled "Exemplary Control Circuit Program." Control circuit 115 is mounted to the motherboard (not shown) of the computer system. However, for other computer systems, the control circuit may be physically coupled to the computer system by other conventional techniques. Also in other systems, the control circuit may be implemented with other conventional electronic components.

Control circuit 115 also performs other functions for computer system 101 such as monitoring the power to the PCI slot connectors 131. Accordingly, Control circuit 115 includes other inputs and/or outputs (not shown) for carrying out these other functions.

Figure 3:
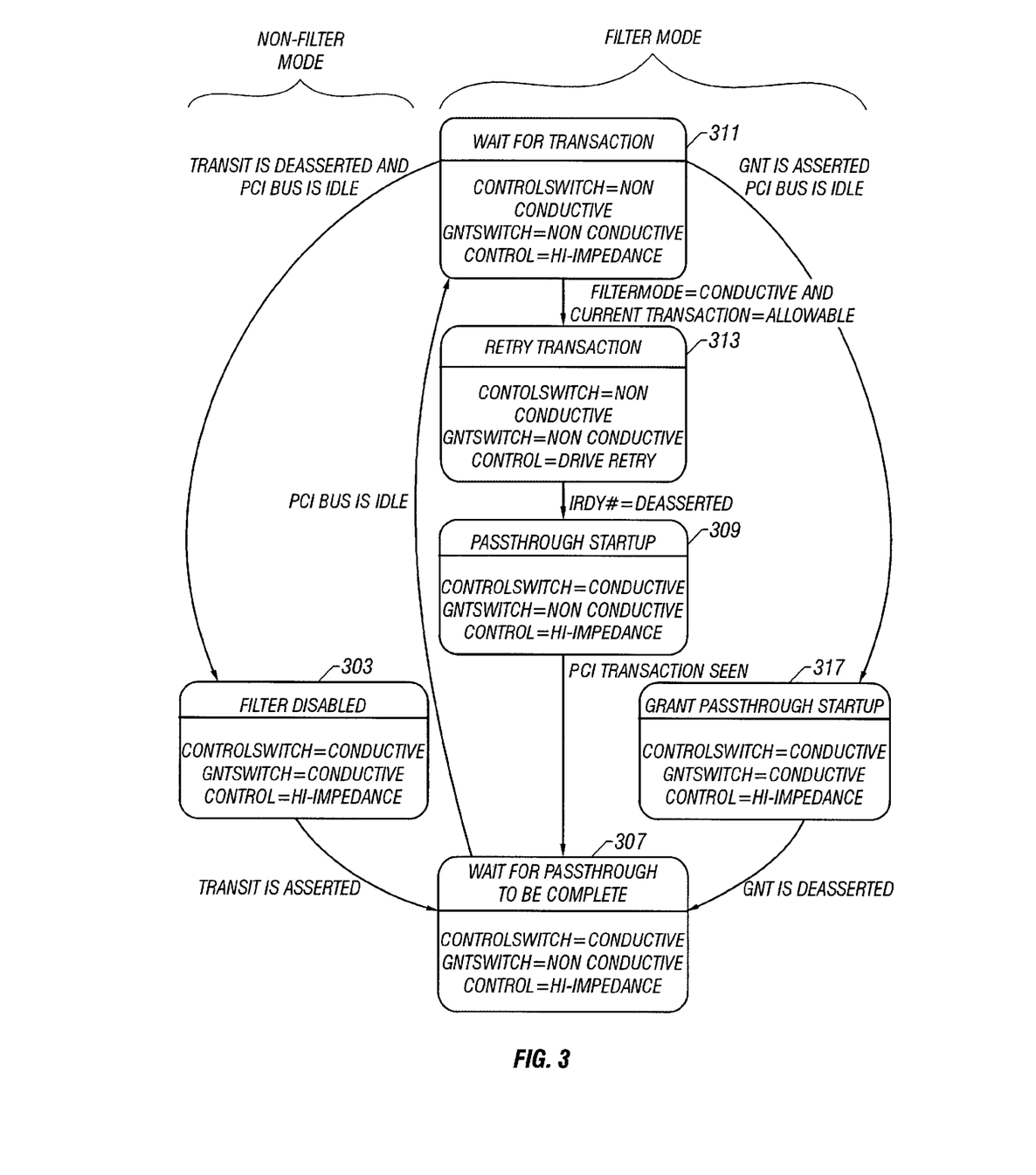
FIG. 3 is an exemplary state machine diagram according to the present invention.

FIG. 3 is a state machine diagram implemented by control circuit 115. In the non Filter mode in state 303, switch circuit 203 is placed in a conductive switch state where bus transactions from computer bus 109 are allowed to pass to bridge circuit 117 (and correspondingly to the devices operably coupled to PCI bus 109 via bridge circuit 117). Also in the non Filter mode, switch circuit 205 is placed in a conductive switch state allowing devices operably coupled to the PCI bus 109 via bridge circuit 117 to receive a GNT# bus signal. Thus, with switch circuits 203 and 205 in conductive switch states, bus transactions are able to pass between bridge circuit 117 and PCI bus 109. Also in the non filter mode, the bus control signal I/O terminals of control circuit 115 are placed in a hi-impedance state, thus having no effect on computer bus 109.

Upon receiving a transit signal from jumper 127 (or from the bridge circuit 117), control circuit 115 transits to state 307 where control circuit 115 monitors the PCI bus 109 and waits for bus 109 to enter an idle bus state. In state 307, switch circuit 205 is placed in a non conductive switch state wherein any down stream master (such as a DMA controller) loses access to the PCI bus 109 due to the decoupling of the GNT# signal from bridge circuit 117. In state 307, control circuit 115 senses when computer bus 109 is in an idle bus state by monitoring to determine when the FRAME # and IRDY# signals have be deasserted. Upon determining that bus 109 is in an idle bus state, control circuit 115 transits to the wait for transaction state 311.

Other control circuits may be programmed to include another state to which the control circuit transits from state 303 in response to receiving the transit signal. This alternative state would similar to state 307 except that switch 205 would remain in the conductive switch state until bus 109 enters an idle bus state, thereby permitting a downstream master to complete all transactions before switch 205 is placed in a non conducting switch state. In response to bus 109 entering an idle bus state, control circuit 115 transits to state 311 from the alternative state.

In the wait for transaction state 311, switch circuit 203 is placed in a non conductive switch state to block bus transactions from computer bus 109 to bridge circuit 117. Also in state 311, switch circuit 205 remains in the non conductive switch state to prevent a downstream master from being granted access to computer bus 109.

Upon receiving an indication that a bus transaction has been initiated on PCI bus 109 by an upstream device and upon determining that the bus transaction is an allowable transaction (e.g. a bus transaction directed to an allowable downstream device), control circuit 115 transits to state 313 where it signals the upstream master device that initiated the allowable bus transaction to reinitiate the allowable bus transaction on computer bus 109. Control circuit 115 receives an indication that a bus transaction has been initiated on bus 109 by sensing that a FRAME# bus signal has been asserted.

If in state 311, the bus transaction is determined to be a non allowable bus transaction, control circuit 115 remains in state 311. A non allowable bus transaction may be a bus transaction to a non allowable device (e.g. a corrupted flash ROM), a specific type of bus transaction such as a memory read, a bus transaction to retrieve data from a particular memory address, or a combination of the above. Control circuit 115 determines whether the transaction is allowable by comparing the target address (or portions of the target address) of the transaction and/or control signals indicating transaction type with the ranges of allowable addresses or allowable transaction types programmed into the control circuit. Control circuit 115 remaining in state 311 during the bus transaction prevents the downstream devices from seeing the transaction due to switch circuit 203 remaining in the non conductive switch state.

In state 313, control circuit 115 signals a master device to reinitiate a transaction by initiating a target initiated termination (such as a retry request or a disconnect request) on PCI bus 109. To initiate a retry request, control circuit 115 asserts the STOP# bus signal on PCI bus 109 during the initial data phase of the bus transaction. The master device that initiated the allowable bus transaction (such as system processor 102 or a memory controller (not shown)) reinitiates the bus transaction in response to the retry request. (See the PCI Rev. 2.1s specification). With other computer systems, a filter circuit may signal the master to reinitiate the bus access utilizing side band signals or other techniques for signaling a master to rebroadcast or reinitiate allowable bus accesses.

In response to the retry request being initiated (more specifically to the IRDY# from control circuit 115 being deasserted), control circuit 115 transits to the passthrough startup state 309 where it places the switch circuit 203 in a conductive switch state to allow the reinitiated allowable bus transaction to pass to bridge circuit 117. Upon sensing that the allowable bus transaction has been reinitiated, control circuit 115 transits back to the wait for the passthrough to be complete state 307 where it monitors computer bus 109 to determine when the reinitiated transaction is complete. When the transaction is determined to be complete (computer bus 109 is in an idle bus state), control circuit 115 transits back to the wait for transaction state 311 where switch circuit 203 is placed in a non conductive switch state to block bus transactions from passing through to bridge circuit 117.

Signaling the master to reinitiate a bus transaction when the control circuit is in the filter mode allows downstream devices to view all of the cycles of an initially blocked allowable bus transactions.

If a downstream device (such as a DMA controller on bridge circuit 117) requests access to computer bus 109 to initiate a transaction directed to a device upstream of filter circuit 112 (such as system memory 103), the downstream device asserts the REQ# signal via bridge circuit 117 (See FIG. 2) and via computer bus 109 to the PCI bus arbiter 137. PCI arbiter 137 grants access to computer bus 109 to the down stream device by asserting the GNT# signal (See FIG. 2). When in state 311, if control circuit senses that the GNT# signal has been asserted and if control circuit 115 determines that computer bus 109 is in an idle bus state, control circuit 115 transits to the Grant passthrough startup state 317 where switch circuits 203 and 205 are both placed in conductive switch states to allow bus transactions from a down stream device to pass to computer bus 109. Switch circuit 203 is not placed in a conductive switch state until bus 109 is in an idle switch state so as to prevent down non allowable devices from being responsive to PCI control bus signals and inadvertently responding to non allowable bus transactions that may be occurring or in the process of occurring from the time that the request is made by the down stream master.

In response to bus arbiter 137 deasserting the GNT# signal to bridge circuit 117, control circuit transits to state 307 where switch circuit 205 is place in a non conductive state. When the transaction to computer bus 109 from the downstream device is complete (computer bus 109 is in an idle bus state), control circuit 115 transits to the wait for transaction state 311.

In state 311, control circuit 115 transits to state 303 in response to the deassertion of the transit signal and in response to bus 109 being in an idle bus state.

Filter circuit 112 allows for transactions being addressed to non allowable devices (such as a corrupt Flash ROM) to be directed to replacement items with the same bus address that are coupled to PCI bus 109 via the slot connectors 131. In the filter mode, because a non allowable bus transaction is not allowed to pass to bridge circuit 117, the newly installed device (and not the non allowable device) will respond to the bus transaction.

An advantage of a computer system having separate filter and bridge circuits is that it enables filtering of selected transactions for a system utilizing a commercially available bridge circuit such as the PIIX 4 wherein undesired features are not deprogrammable. However, it can be appreciated that the filter circuit may be integrated with the bridge circuit such as where both circuits are on the same integrated circuit semi conductor chip. Also, the switch circuits and the control circuits may be integrated on the same chip.

Besides being utilized to boot-up a computer system, the filter circuit is also useful in debugging the computer system. For example, if a keyboard controller 119 is suspected of malfunctioning, a new keyboard controller can be operably coupled to computer system 101 via bus 109 whereby the existing keyboard controller 119 may be disabled by filtering bus transactions to the existing controller 119. A computer system repair business or computer system manufacturer may include a plurality of different types of control circuits that are insertable into a socket mounted on the motherboard where each type of control circuit is programmed to block a different device operably coupled to computer bus 109 via bridge circuit 117. If no control circuit is installed in system 101, then the switching circuits 113 are in a conductive switch state allowing all bus transactions from bus 109 to pass to bridge circuit 117 (and vice versa). Coupling a control circuit to system 101 would place filter circuit 112 in a filter mode to filter bus access as per the programmed control circuit.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

Exemplary Control Circuit Program

The following is an example of code used to program a PAL of a control circuit according to the present invention.

```
library IEEE;
use IEEE.std_logic_1164.all;
library metamor;
use metamor.attributes.all;
--Hotplug Pal
--    $Revision: 1.7 $
entity pci_stt is
    port (
    PCICLK: in STD_LOGIC;
        PCIRST: in STD_LOGIC;
        FRAME: in STD_LOGIC;
        IRDY: in STD_LOGIC;
        CHIPRST: in STD_LOGIC;
        SMVU_TRDY: in STD_LOGIC;
        SMVU_STOP: out STD_LOGIC;
        SMVU_DEVSEL: inout STD_LOGIC;
        SMVU_QS_EN: out STD_LOGIC;
        SMVU_CBE2: in STD_LOGIC;
        SMVU_AD24: in STD_LOGIC;
        PIIX_GNT: in STD_LOGIC;
        CARDBIOS: in STD_LOGIC;
        ISA_SMVU: in STD_LOGIC
);
end pci_stt;
architecture pci_stt_arch of pci_stt is
-- PIIX disable state machine signals
    type SMVU_STATE is (IDLE, RETRYFAST, RETRYMED, RETRYSLOW,
RETRYSUB, DERETRY, PASSA, PASSB);
    attribute enum_encoding of SMVU_STATE: type is "one hot";
    signal next_state state: SMVU_STATE;
    signal pciblock: STD_LOGIC;
    signal smvu_frame, smvu_irdy, smvu_clk, smvu_rst: STD_LOGIC;
begin
-- piix disable for PCI smvu
-- this state machine prevents the PIIX from responding to cycles intended
-- for the onboard flash to allow for a plug-in PCI SMVU card to respond
-- instead. The PIIX's PCI control signals are isolated from the PCI bus
-- with quick switches. The state machine monitors the PCI bus. If it finds
-- a transaction started that should be answered by the PIIX (a non memory trans, or
-- a memory trans below 16MB) then it retries the transaction and connects the quickswitch
-- until the next successful data transfer takes place. The switch also connects if
-- the PIIX is able to start a transaction (GNT and bus-idle) to allow floppy DMA.
-- intended use would be booting to the pci-smvu, then disabling the piix-filtering once
-- shadowing is done (via the cardbios-dis GPO of the piix) to avoid any unknown accesses
-- being filtered. Flashing the onboard is done normally, flashing the smvu requires
-- disabling the piix.
smvu_frame <= FRAME(0);
```

-continued

```
smvu_irdy <= IRDY(0);
smvu_clk <= PCICLK(0);
smvu_rst <= PCIRST(0);
-- filter PIIX flash access if the cardbios jumper is installed and enabled
--   (ie. GPO_CARDBIOS_DIS is not active) and the ISA_SMVU card is not installed
-- (as detected by grounding pin 8 of the ISA_SMVU connector)
process (CARDBIOS, ISA_SMVU)
begin
    if (CARDBIOS='0' and ISA_SMVU='1') then
        pciblock<='1';
    else
        pciblock<='0';
    end if;
end process;
NS: process (state, pciblock, smvu_frame, SMVU_CBE2,
                            SMVU_AD24, SMVU_TRDY smvu_irdy,
PIIX_GNT, SMVU_DEVSEL)
begin
    next_state <= state;
    case state is
        when IDLE =>
            --in a blocking state, looking for a
            --transaction destined for the PIIX
            if (pciblock='1' and smvu_frame='0' smvu_irdy='1' and
((SMVU_CBE2='1' and
                            SMVU_AD24='0') or
SMVU_CBE2='0')) then
                -- this is intended for the PIIX. need to cause a retry
                next_state <= RETRYFAST;
            elsif (PIIX_GNT='0' and smvu_frame='1' and smvu_irdy='1')
then
                -- this is a transaction coming from the PIIX - must pass
through
                -- (only filtering PIIX-target transactions) - this allows DMA
testing
                -- likely broken (have to keep the PIIX from starting
until connected to the bus)
                next_state <= PASSA;
            elsif (pciblock='0') then
                -- blocking disabled by no jumper or is a smvu - pass through
                next_state <= PASSB;
            else
                next_state <= IDLE;
            end if;
        when RETRYFAST =>    -- drive a target retry on the PCI bus if
filter is FAST DEVSEL
            -- we're a subtractive decoder, so we wait for two more clocks
            if (SMVU_DEVSEL = '0') then
                next_state <= IDLE;
            else
                next_state <= RETRYMED;
            end if;
        when RETRYMED =>    -- drive a target retry on the PCI bus if
filter is MEDIUM DEVSEL
            -- we're a subtractive decoder, so we wait for one more clocks
            if (SMVU_DEVSEL = '0') then
                next_state <= IDLE;
            else
                next_state <= RETRYSLOW;
            end if;
        when RETRYSLOW =>  -- drive a target retry on the PCI bus if
filter is SLOW DEVSEL
            -- we're a subtractive decoder, so we wait for next clock
            if (SMVU_DEVSEL = '0') then
                next_state <= IDLE;
            else
                next_state <= RETRYSUB;
            endif;
        when RETRYSUB =>    -- drive a target retry on the PCI bus
            if (smvu_frame='1') then
                -- the transaction has been target aborted
                -- await the retry
                next_state <= DERETRY;
            else
                next_state <= RETRYSUB;
            end if;
        when DERETRY => -- deasserting the retry for one clock only
            next_state <= PASSA;
```

```
                when PASSA => -- waiting for next successful data phase
                    if (smvu_irdy='0' and SMVU_TRDY='0') then
                            -- first successful data phase, allow rest of transfer (for a
burst)
                        next_state <= PASSB;
                    else
                        next_state <= PASSA;
                    end if;
                when PASSB => -- waiting for idle state to reconsider transaction
filtering
                    if (pciblock='1' and smvu_frame='1' and smvu_irdy='1') then
                            -- the non filtered transaction has completed, return to
                            -- transaction monitoring-blocking state
                        next_state <= IDLE;
                    else
                        next_state <= PASSB;
                    end if;
            end case;
    end process NS;
    -- state register for smvu-piix filtering
    process (smvu_clk, smvu_rst)
    begin
        if (smvu_rst='0') then
            state <= PASSB;
        elsif (smvu_clk'event and smvu_clk='1') then
            state <= next_state;
        end if;
    end process;
    -- smvu-piix control signals for retry:
    process (state)
    begin
        if(state=RETRYSUB) then
            SMVU_STOP <= '0';
            SMVU_DEVSEL <= '0';
        elsif (state=DERETRY) then
            SMVU_STOP <= '1';
            SMVU_DEVSEL <= '1';
        else
            SMVU_STOP <= 'Z';
            SMVU_DEVSEL <= 'Z';
        end if;
    end process;
    -- smvu-piix quickswitch enable
    SMVU_QS_EN <= '0' when (state=PASSA or state=PASSB) else '1';
end pci_stt_arch;
```

What is claimed is:

1. A computer system comprising:

a system processor;

a computer bus, the system processor operably coupled to the computer bus; and a filter circuit coupled to the computer bus, the filter circuit controlling bus accesses to a group of at least two devices operably coupled to the computer bus, the filter circuit operable in a filter mode and a non filter mode, wherein:

in the non filter mode, the filter circuit allows bus accesses from the computer bus to pass to the group; and in the filter mode, the filter circuit (i) initially blocks bus accesses from the computer bus from passing to the group, in response to a bus signal, determines that a bus access is an allowable bus access, (ii) signals a device that initiated the allowable bus access to reinitiate the allowable bus access, and (iii) allows the reinitiated allowable bus access to pass to the group.

2. The computer system of claim 1 wherein:

the filter circuit allows bus accesses to pass to the group by enabling computer bus control signals to pass through the filter circuit;

the filter circuit blocks bus accesses from the computer bus from passing to the group by isolating the computer bus control signals from the group.

3. The computer system according to claim 1 wherein the filter circuit includes:

a switch circuit; and a control circuit, the control circuit placing the switch circuit in a conductive switch state to allow bus accesses from the computer bus to pass to the group, the control circuit placing the switch circuit in a non conductive switch state to block bus accesses from passing to the group.

4. The computer system of claim 1 wherein the computer bus conforms to a computer bus standard based upon the Peripheral Component Interconnect (PCI) bus specification.

5. The computer system of claim 1 wherein the filter circuit initiates a bus access termination request on the computer bus to signal the device that initiated the allowable bus access to reinitiate the allowable bus access.

6. The computer system of claim 1 further comprising:

a first device operably coupled to the computer bus, the first device having a first bus address;

wherein the group includes a second device operably coupled to the computer bus, the second device having the same first bus address as the first device;

wherein an access addressed to the first bus address is a non allowable bus access.

7. The computer system of claim 1 wherein the filter circuit transits from a non filter mode to a filter mode in response to a manually set transit signal.

8. The computer system of claim 1 wherein the filter circuit transits from a non filter mode to a filter mode in response to a system processor initiated transit signal.

9. The computer system of claim 1 further comprising:
a bridge circuit, the group of at least one device coupled to the computer bus via the bridge circuit.

10. The computer system of claim 1 wherein an allowable bus access is a transaction that is directed to an allowable device of the group.

11. The computer system of claim 1 wherein an allowable bus access is a particular type of bus access directed to a device of the group.

12. The computer system of claim 1 wherein in the filter mode:
the filter circuit allows a bus access from a device of the group to pass to the computer bus.

13. The computer system of claim 3 wherein the control circuit provides and a control signal to change the switch state of the switch circuit.

14. The computer system of claim 3 wherein the switch circuit includes:
a plurality of switches each coupled to a computer bus control signal, when the switch circuit is in a conductive switch state, the plurality of switches are made conductive, when the switch circuit is in a non conductive switch state, the plurality of switches are made non conductive;
wherein the control circuit allows bus accesses to pass to the group by making the plurality of switches conductive to enable the bus control signals to be received by the group via the switch circuit;
wherein the filter circuit blocks bus accesses from passing to the group by making the plurality of switches non conductive to prevent the group from receiving the computer bus control signals.

15. The computer system of claim 3 wherein the control circuit includes a programmable logic circuit.

16. The computer system of claim 3 wherein the switch circuit includes a solid state bi-directional relay.

17. The computer system of claim 3 wherein the control circuit is coupled to the computer bus so as to read at least part of bus addresses of bus accesses from the computer bus in determining whether a bus access is an allowable bus access.

18. The computer system of claim 3 wherein the control circuit is coupled to the computer bus to signal via the computer bus the device that initiated the allowable bus access to reinitiate the allowable bus access.

19. The computer system of claim 6 further comprising:
a physical slot connector electrically connected to the computer bus, the first device operably coupled to the computer bus via the slot connector.

20. The computer system of claim 6 wherein the second device includes a Flash ROM.

21. The computer system of claim 9 further comprising:
a device operably coupled to the computer bus via the bridge circuit;
wherein a bus transaction directed to the device is an allowable transaction.

22. The computer system of claim 10 wherein the filter circuit determines whether a bus address is directed towards an allowable device by comparing at least part of the address of the transaction with stored values of allowable addresses.

23. A computer system comprising:
a system processor;
a computer bus, the system processor operably coupled to the computer bus; and
a filter circuit coupled to the computer bus, the filter circuit controls bus accesses to a group of at least one device operably coupled to the computer bus, the filter circuit operating in a filter mode and a non filter mode, wherein:
in the non filter mode, the filter circuit allows bus accesses from the-computer bus to pass to the group;
in the filter mode, the filter circuit blocks bus accesses from the computer bus from passing to the group, in response to determining that a bus access is an allowable bus access, the filter circuit signals a device that initiated the allowable bus access to reinitiate the allowable bus access wherein the filter circuit allows the reinitiated allowable bus access to pass to the group;
wherein in the filter mode, the filter circuit allows a bus access from a device of the group to pass to the computer bus;
wherein in the filter mode, the filter circuit blocks bus accesses from the group from passing to the computer bus, the filter circuit allows the bus access from a device of the group to pass to the computer bus in response to a determination that the computer bus is in an idle bus state and in response to the device being granted access to the computer bus.

24. The computer system of claim 23 wherein the filter circuit further includes:
a first switch circuit;
a second switch circuit; and
a control circuit;
the filter circuit allows bus accesses to pass to the computer bus by the control circuit placing the first switch circuit in a conductive state to allow a first set of at least one computer bus control signal to pass through the first switch circuit and by placing the second switch circuit in a conductive state to allow a bus grant signal from a bus arbiter to pass though the second switch circuit, the bus grant signal indicating to the device of the group that access to the computer bus by has been granted by the computer bus arbiter, wherein the control circuit receives the bus grant signal;
the filter circuit blocks bus accesses from passing to the computer bus by placing the first switch circuit in a non conductive state to block the first set from passing through the first switch circuit and by placing the second switch circuit in a conductive state to block the bus grant signal from passing through the second switch circuit.

25. A method of filtering bus accesses from a computer bus comprising:
transiting to a filter mode from a non filter mode in response to receiving a filter mode transit indication;
when in the non filter mode:
placing the switch circuit in a conductive switch state to enable a group of at least two devices coupled to a computer bus to receive accesses from the computer bus;
when in the filter mode:
placing the switch circuit in a non conductive switch state to block accesses from passing to the group;
sensing a bus access on the computer bus; and determining, in response to a bus signal, whether the bus access is an allowable access;

if the bus access is determined to be an allowable access: signaling a device to re-initiate the allowable access; and placing the switch circuit in a conductive switch state to enable the group to receive the allowable access.

26. The method of claim 25 further comprising:

in the filter mode:

placing the switch circuit in a conductive switch state to allow a device of the group to initiate an access on the bus.

27. The method of claim 25 further comprising:

when in the filter mode:

determining that a device of the group has been granted access to the computer bus;

after determining that the device of the group has been granted access, placing a second switch circuit in a conductive switch state to allow the device to receive an indication that it has been granted access to the computer bus.

28. The method of claim 25 further comprising:

providing the filter mode transit indication to transit to the filter mode from the non filter mode so as to block accesses directed towards a non allowable device of the group.

29. The method of claim 25 wherein the computer bus conforms to a standard based upon the Peripheral Component Interconnect (PCI) specification.

30. The method of claim 25 wherein the determining whether the bus access is an allowable access further includes determining whether the bus access is directed toward an allowable device of the group.

31. A method of filtering bus accesses from a computer bus comprising:

transiting to a filter mode from a non filter mode in response to receiving a filter mode transit indication;

when in the non filter mode:

placing the switch circuit in a conductive switch state to enable a group of at least one device coupled to a computer bus to receive accesses from the computer bus;

when in the filter mode:

placing the switch circuit in a non conductive switch state to block accesses from passing to the group;

sensing a bus access on the computer bus; and determining whether the bus access is an allowable access;

if the bus access is determined to be an allowable access: signaling a device to re-initiate the allowable access; and placing the switch circuit in a conductive switch state to enable the group to receive the allowable access;

when in the filter mode:

determining that a device of the group has been granted access to the computer bus;

after determining that the device of the group has been granted access, placing a second switch circuit in a conductive switch state to allow the device to receive an indication that it has been granted access to the computer bus;

the placing the second switch circuit in the conductive switch state occurs after determining that the computer bus is in an idle bus state.

32. The method of claim 28 further comprising:

operably coupling a second device to the computer bus, the device having the same bus address as the non allowable device of the group.

33. The method of claim 29 wherein the signaling the device includes initiating a retry request on the computer bus.

34. The method of claim 32 further comprising:

utilizing accesses to the second device in booting up a computer system that incorporates the computer bus.

35. A computer system comprising:

a system processor;

a computer bus conforming to a standard based upon a Peripheral Component Interconnect (PCI) specification, the system processor operably coupled to the computer bus; and a filter circuit coupled to the computer bus, the filter circuit controlling bus transactions from the computer bus to a group of at least one device operably coupled to the computer bus, the filter circuit operating in a filter mode and a non filter mode, wherein:

in the non filter mode, the filter circuit allows bus transactions from the computer bus to pass to the group;

in the filter mode, the filter circuit (i) initially blocks bus transactions from the computer bus from passing to the group, in response to a bus signal, determines that a bus transaction is an allowable bus transaction, and (iii) initiates a target initiated request on the computer bus wherein the filter circuit allows a reinitiated allowable bus transaction to pass to the group.

36. The computer system of claim 35 wherein in the filter mode:

the filter circuit allows a bus transaction from a device of the group to pass to the computer bus.

37. The computer system of claim 34 wherein an allowable transaction is a transaction that is directed to an allowable device of the group.

38. The computer system of claim 34 wherein the filter circuit includes:

a switch circuit; and a control circuit, the control circuit placing the switch circuit in a conductive switch state to allow bus transactions from the computer bus to pass to the group, the control circuit placing the switch circuit in a non conductive switch state to block bus transactions from passing to the group.

39. The computer system of claim 35 wherein the target initiated termination request is a retry request.

40. The computer system of claim 35 further comprising:

a first device operably coupled to the computer bus, the device having a first bus address;

wherein the group includes a second device, the second device having the same first bus address as the first device;

wherein a transaction addressed to the first bus address is a non allowable bus transaction.

41. The computer system of claim 35 further comprising:

a bridge circuit, the group of at least one device operably coupled to the computer bus via the bridge circuit.

42. A computer system comprising:

a system processor;

a computer bus conforming to a standard based upon a Peripheral Component Interconnect (PCI) specification, the system processor operably coupled to the computer bus; and a filter circuit coupled to the computer bus, the filter circuit controlling bus transactions from the computer bus to a group of at least one device operably coupled to the computer bus, the filter circuit operating in a filter mode and a non filter mode, wherein:
in the non filter mode, the filter circuit allows bus transactions from the computer bus to pass to the group;

in the filter mode, the filter circuit blocks bus transactions from the computer bus from passing to the group, in response to-determining that a bus transaction is an allowable bus transaction, the filter circuit initiates a target initiated request on the computer bus wherein the filter circuit allows a reinitiated allowable bus transaction to pass to the group;

wherein in the filter mode, the filter circuit allows a bus transaction from a device of the group to pass to the computer bus;

wherein in the filter mode, the filter circuit blocks bus transactions from being initiated the computer bus, the filter circuit allows the bus transaction from the device of the group to be initiated on the computer bus in response to a determination that the computer bus is in an idle bus state and in response a bus arbiter asserting a GNT# signal directed towards the device.

43. The computer system of claim 38 wherein the switch circuit includes:

a plurality of switches each coupled to a computer bus control signal, when the switch circuit is in a conductive switch state, the plurality of switches are made conductive, when the switch circuit is in a non conductive switch state, the plurality of switches are made non conductive;

wherein the control circuit allows bus transactions to pass to the group by making the plurality of switches conductive to enable the computer bus control signals to be received by the group via the switch circuit;

wherein the filter circuit blocks bus transactions from passing to the group by making the plurality of switches non conductive to isolate the computer bus control signals from the group.

44. The computer system of claim 40 further comprising:

a physical slot connector electrically connected to the computer bus, the second device operably coupled to the computer bus via the slot connector.

45. The computer system of claim 43 the computer bus control signals include a FRAME# bus signal, a IRDY# bus signal, a TRDY# bus signal, a STOP# bus signal, and a DEVSEL# bus signal.

46. A filter circuit for controlling bus accesses from a computer bus to a group of at least one device operably coupled to the computer bus comprising:

a switch circuit;

a control circuit;

wherein the filter circuit operates in a filter mode and a non filter mode:

in a non filter mode, the control circuit places the switch circuit a conductive switch state to initially allow accesses from the computer bus to pass to the group;

in a filter mode, the control circuit (i) places the switch circuit in a non conductive switch state to block accesses from the computer bus from passing to the group, (ii) in response to a bus signal, determines that an access is directed towards an allowable device of the group, (iii) signals to a device that initiated the allowable access to reinitiate the allowable access, and (iv) places the switch circuit in a conductive switch state to allow the reinitiated access to pass to the group.

47. The filter circuit of claim 46 further comprising:

a second switch circuit;

in the non filter mode, the control circuit places the second switch circuit in a conductive switch state;

in the filter mode, the control circuit places the first and second switch circuits in conductive states to allow a bus access from a device of the group to pass to computer bus.

48. The filter circuit of claim 46 wherein the bus access conform to a standard based upon a Peripheral Component Interconnect (PCI) specification.

49. The filter circuit of claim 46 further comprising:

address inputs for receiving computer bus address signals from the computer bus;

wherein the control circuit utilizes data received via the address inputs to determine that an access is an allowable access.

50. The filter circuit of claim 46 wherein:

the switch circuit includes a plurality of switches, each of the plurality of switches is coupled to a computer bus control signal;

bus accesses are allowed to pass to the group by making the plurality of switches conductive to enable the group to receive the computer bus control signals via the plurality of switches;

bus accesses are blocked from passing to the group by making the plurality of switches non conductive to prevent the group from receiving the computer bus control signals.

51. The filter circuit of claim 46 wherein the filter circuit is implemented as an integrated circuit.

52. The filter circuit of claim 46 wherein the control circuit includes a programmable logic device.

53. The filter circuit of claim 46 wherein the control circuit is coupled to the computer bus to signal via the computer bus the device that initiated the allowable bus access to reinitiate the allowable bus access.

54. Method for booting up a computer system from an auxiliary memory device comprising:

inserting an auxiliary boot up memory device circuit into a computer bus connector;

activating a filter circuit coupled to the computer bus, the filter circuit controlling accesses to a group of devices that includes a system boot-up memory device;

in response to activation, the filter circuit blocks accesses from the computer bus to the group;

monitoring the computer bus by the filter circuit to detect an access directed towards a device of the group but not directed to the system boot-up memory device;

in response to detecting an access on the computer bus directed toward a device of the group but not directed to the system boot-up memory device, signaling a device that initiated the access to reinitiate the access.

55. The method of claim 54 wherein the auxiliary and system boot-up memory devices each include a flash ROM.

* * * * *